Nov. 28, 1933.  G. ROACH ET AL  1,937,436
AGRICULTURAL IMPLEMENT
Filed Dec. 21, 1931  4 Sheets-Sheet 1
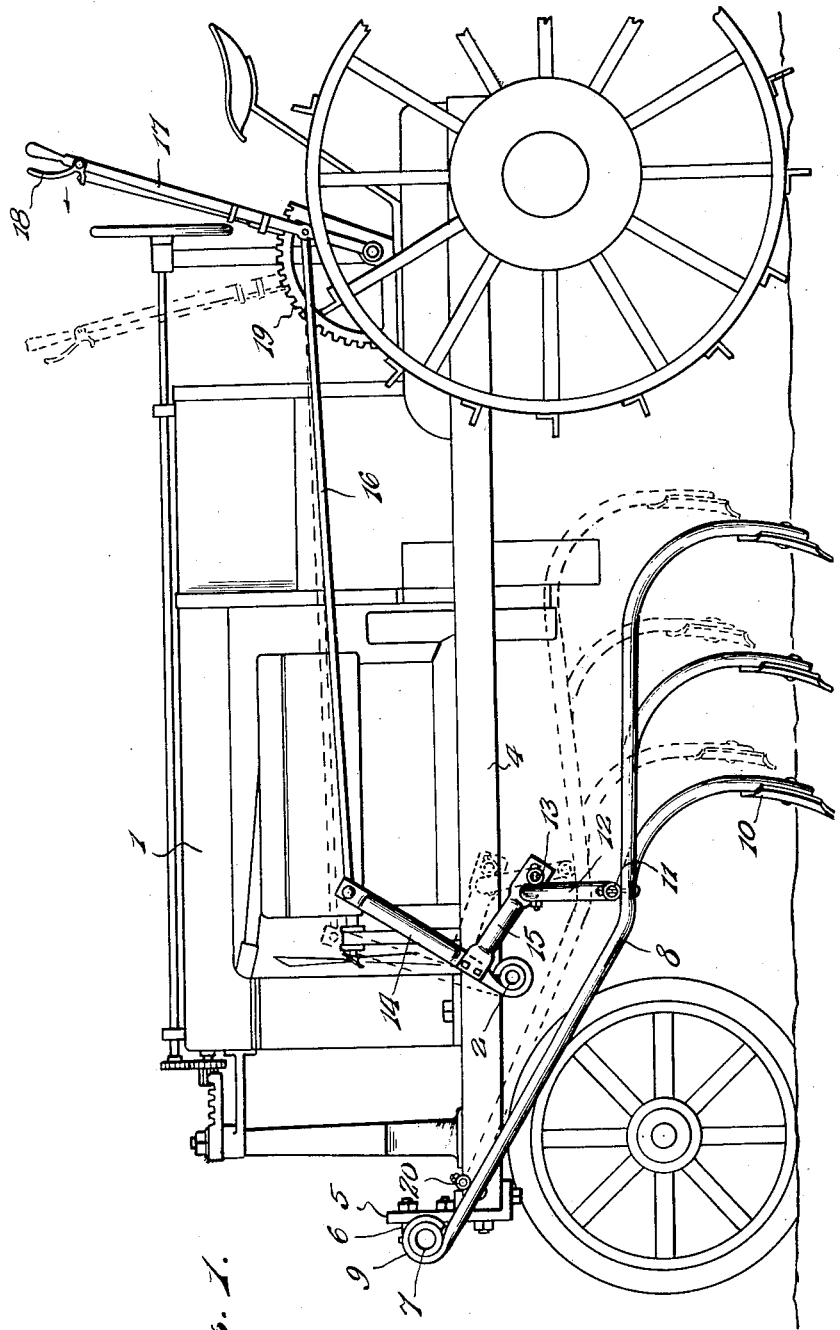
Inventors
George Roach.
Darry Winn.
By Lacey & Lacey, Attorneys

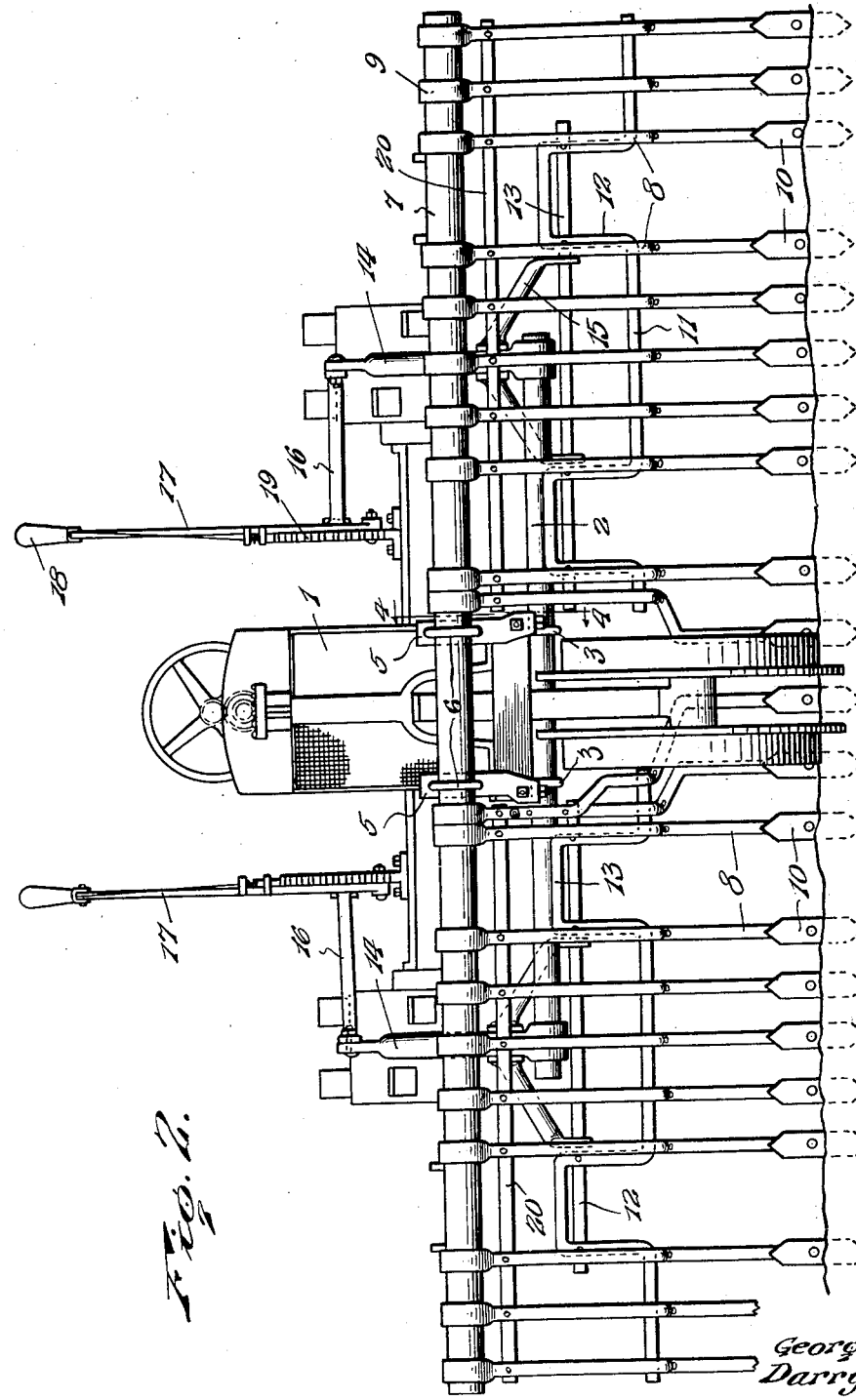

Nov. 28, 1933.  G. ROACH ET AL  1,937,436
AGRICULTURAL IMPLEMENT
Filed Dec. 21, 1931  4 Sheets-Sheet 3
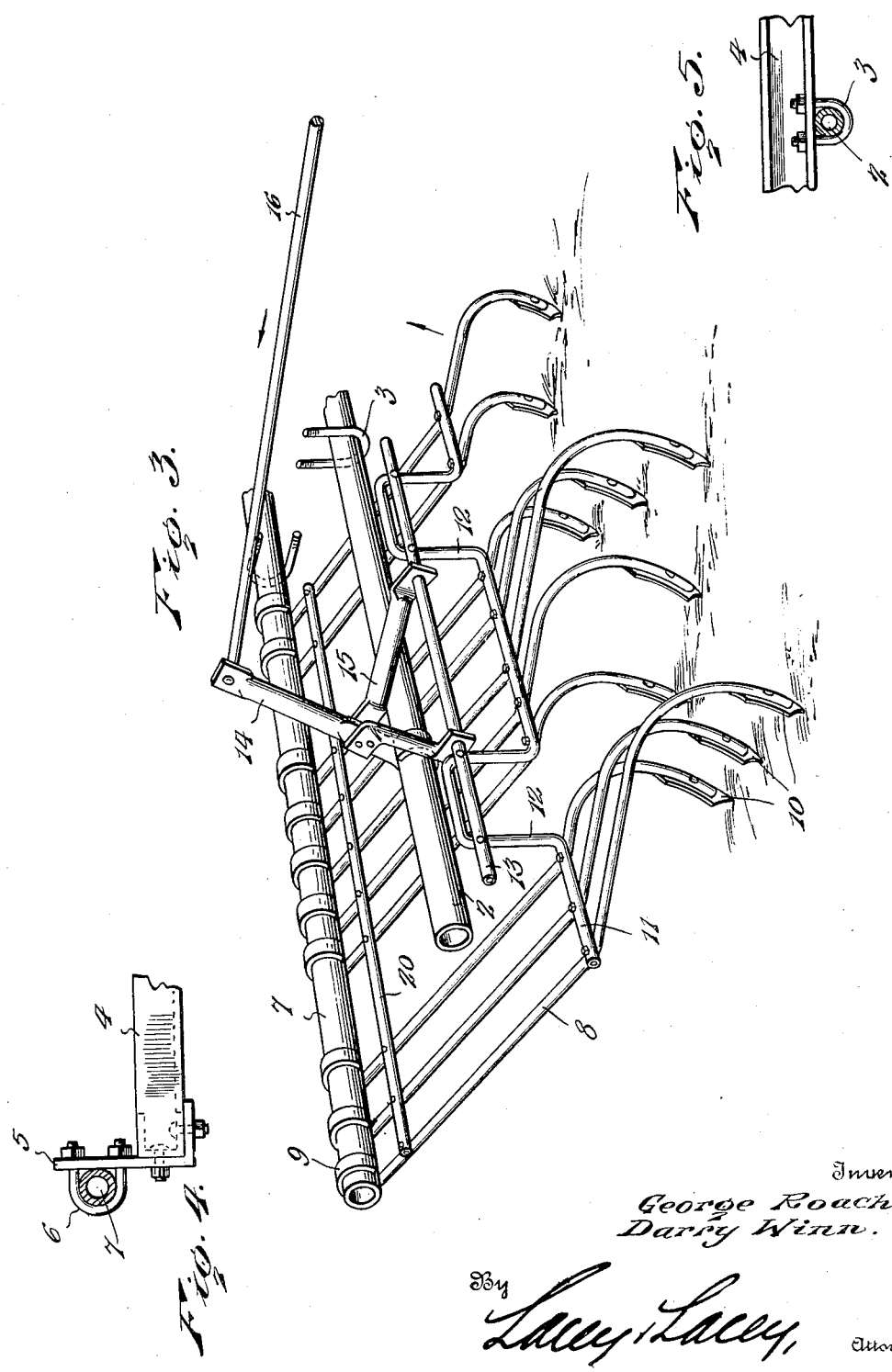
Inventors
George Roach.
Darry Winn.
By Lacey & Lacey, Attorneys

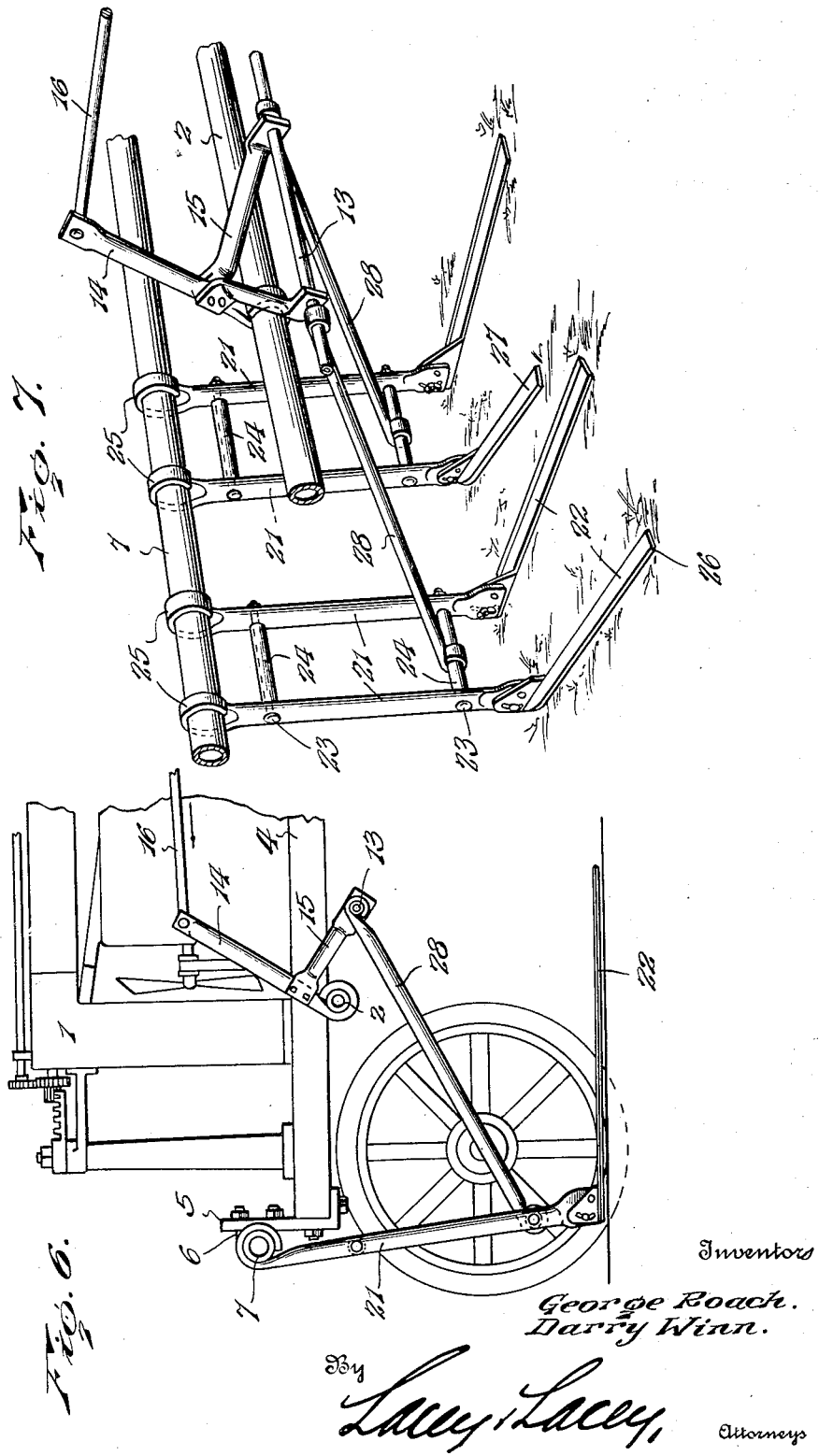

Patented Nov. 28, 1933

1,937,436

UNITED STATES PATENT OFFICE 1,937,436

AGRICULTURAL IMPLEMENT

George Roach and Darry Winn, Clovis, N. Mex.

Application December 21, 1931
Serial No. 582,398

4 Claims. (Cl. 97—47)

This invention is an agricultural implement which may be mounted upon the front end of a tractor and employed to cultivate four rows of plants simultaneously. The invention also includes means for destroying weeds which might interfere with the development of the crop and includes means whereby the implements at the sides of the tractor may be adjusted independently. The invention is illustrated in the accompanying drawings and will be hereinafter fully described, the novel features being particularly defined in the appended claims.

In the drawings,

Figure 1 is a side elevation of a tractor and a cultivator mounted thereon in accordance with our present invention, Fig. 2 is a front elevation of the same, Fig. 3 is a perspective view of the cultivator removed from the tractor, Fig. 4 is a detail section on the line 4—4 of Fig. 2, Fig. 5 is a detail section showing the manner of supporting the fulcrum bar on the tractor, Fig. 6 is a side elevation of the front end of the tractor showing the weed cutters mounted thereon, Fig. 7 is a detail perspective view of the weed cutters removed from the tractor.

The tractor, indicated at 1, may be of any known or approved form. The tractor illustrated has two relatively small steering wheels mounted at its front end for turning about a vertical axis as a unit and larger driving wheels mounted at its rear end, at its opposite sides, but the particular type of tractor is immaterial.

In carrying out the present invention, a fulcrum rod 2 is mounted upon the tractor and is preferably held thereto by U-bolts 3 fitted beneath the tractor and having their ends secured in the side sills of the tractor, indicated at 4. Brackets 5 are also secured to the front ends of the tractor sills and these brackets, as shown in Figs. 1 and 4, project above the sills and receive the ends of U-bolts 6 which pass around and form bearings for the front beam 7 of the device, and it may be noted, at this point, that the fulcrum bar 2 and the beam 7 are preferably tubes so as to furnish the maximum strength with minimum weight. The beam 7 projects past the opposite sides of the tractor and extends across the front of the same, as clearly shown in Fig. 2, and upon this supporting beam are mounted the plow or cultivator beams 8. The plow or cultivator beams 8 have their front ends formed into eyes or loops 9 which fit around the supporting beam 7, as clearly shown in the drawings, and extend downwardly and rearwardly from the said eyes to a point below and somewhat to the rear of the fulcrum bar 2 from which point the beams extend on lines which are normally horizontal, as will be understood upon reference to Fig. 1. The beams 8 are arranged in groups and the beams in each group vary in length so that the shovels or cultivator blades 10, which are secured to the downturned rear extremities of the beams, will be disposed along oblique lines and, when in use, will successively engage the surface soil and turn the same up toward the rows of plants to properly shape and ridge the same. The end groups have three cultivators or plows while the intermediate groups have five cultivators or plows, and an open space is provided between each two groups of implements so that, as shown in Fig. 2, four rows of plants may be cultivated simultaneously, the tractor being disposed centrally of the several groups of implements with the steering wheels running between the inner two rows and the driving wheels running at the sides of the inner two rows. The plow or cultivator beams are connected so that all of the implements at one side of the tractor may be raised or lowered simultaneously and the implements at the two sides of the tractor may be independently adjusted. Cross braces 11 are provided to connect the groups of implements and these braces consist of small pipes or rods firmly bolted or otherwise secured to the several plow or cultivator beams adjacent the bends therein and provided, between the several groups, with upstanding cranked or arched portions 12, these arched portions providing clearance for the plants, as will be understood. A connecting bar 13 is disposed transversely of the cultivators or plows and is firmly secured to the arched portions 12 of the cross brace 11 so that any lifting force applied to the connecting bar 13 will be transmitted equally to all the connected plows or cultivators. A rocking arm or lever 14 is mounted upon the fulcrum bar 2 to rock thereon and near its lower end there is secured a V-shaped rearwardly extending crank 15 the ends of which are connected pivotally with the connecting bar 13, as shown most clearly in Fig. 3. A connecting rod 16 is pivoted at its front end to the upper end of the rocking arm or lever 14 and, at its rear end, is pivoted to the hand lever 17 which is a part of the regular equipment of the tractor, said lever 17 being equipped with the usual latch 18 cooperating with a segment 19 whereby the lever will be held in a set position. The hand levers are duplicated at the two sides of the tractor so that the plows or cultivators at either side of the tractor may be raised or lowered independently of the implements at the other side of the tractor. To further impart rigidity to the groups of cultivators and to insure their simultaneous operation, a cross bar 20 is connected to the several beams 8 near their upper front ends, as shown, at each side of the tractor.

The use of the implement thus far described will be readily understood and appreciated. The several blades may be raised above the ground, as indicated by dotted lines in Fig. 1, when the tractor is being driven from one field to another field or along a road, and may be lowered by manipulation of the hand levers 17 when the field to be cultivated has been reached. The tractor is then driven along the rows of plants and the shovels or cultivator blades will enter the surface soil and loosen the same and turn the loosened soil over against the plants to protect them and induce their proper and rapid growth. The machine is exceedingly simple and is not apt to get out of order and, when in use, has been found highly efficient.

In Figs. 6 and 7, we have illustrated weed cutters which may be mounted upon the front supporting beam 7 and may be used simultaneously with the cultivators or separately therefrom, the drawings showing the weed cutters separate from the cultivators merely as a matter of convenience and to more clearly disclose the structure and arrangement of the several parts. Each weed cutter comprises a beam or standard 21 and a knife 22 secured to the lower end of the standard. The standards are connected in pairs by long bolts 23 inserted therethrough and passing through spacing sleeves 24 whereby the proper spaced relation of the standards is maintained. Each standard has its upper end formed into a ring or loop 25 which encircles the supporting beam 7 and may rock about the same. The blades or knives 22 consist of flat bars having their outer edges sharpened, as indicated at 26, and the adjacent blades are disposed in divergent relation so that they will operate toward the respectively adjacent rows of plants. One blade, indicated at 27, is shorter than the other blades so that there will be ample space for the clearance of trash as the implement is carried over the field. The lower bolt 23 or spacing sleeve 24 is engaged by the lower front end of a connecting rod 28 which extends upwardly and rearwardly therefrom and is pivotally engaged at its rear end about the connecting bar 13 which is carried by the crank 15. When the rocking arm or lever 14 is swung rearwardly, the bar 13 will move downwardly and the cultivator blades or weed cutters will consequently be lowered to the ground so as to perform their allotted functions. If the rocking arm or lever 14 be swung forwardly, the crank 15 and the bar 13 will be moved upwardly and the cutters or cultivator blades will be lifted from the ground so that the apparatus may be turned about a corner or reversed or moved to another field.

Having thus described the invention, we claim,

1. Apparatus for the purpose set forth comprising a supporting beam, means for securing said beam upon the front end of a tractor with its ends projecting beyond the sides of the tractor, a fulcrum bar, means for securing said bar upon the bottom of a tractor near the front end thereof with its ends projecting beyond the sides of the tractor, groups of tilling implements pivotally hung on the supporting beam, rocking arms mounted upon the fulcrum bar at the sides of the tractor, a cross brace connecting the tilling implements and provided with upstanding arched portions disposed between the groups, and connections between said rocking arms and the arched portions of the cross brace whereby the tilling implements at one side of the tractor may be simultaneously raised or lowered.

2. Apparatus for the purpose set forth comprising a supporting beam, upstanding brackets for securing said beam upon the front of a tractor, series of tilling implements pivotally suspended from said beam, transverse braces connecting the tilling implements in groups between the ends of the implements and provided with upstanding arched portions, a fulcrum bar, means for mounting said fulcrum bar upon the bottom of a tractor at a point in advance of the transverse braces and at the rear of the supporting beam, a rocking arm mounted upon and rising from the fulcrum bar, a crank extending rearwardly from the rocking arm, and connections between the crank and the upstanding arched portions of said transverse braces.

3. Apparatus for the purpose set forth comprising a supporting beam, means for securing said beam upon the front end of a tractor, cultivator beams having their front ends journaled upon said supporting beam, blades carried by said cultivator beams, the beams and blades being arranged in groups with the blades running in different parallel paths, a cross brace connecting the cultivator beams and having upstanding portions between the groups of the beams, a fulcrum bar, means for securing the fulcrum bar upon a tractor at the rear of the supporting beam, a rocking arm mounted upon the fulcrum bar, a crank extending rearwardly from the rocking arm, and a connecting rod engaged with the crank and secured to the upstanding portions of the cross brace.

4. Apparatus for the purpose set forth comprising a supporting beam, means for securing said beam upon the front end of a tractor, beams depending from the supporting beam and arranged in groups, the upper ends of said depending beams being provided with loops fitting around and secured to the supporting beam, blades carried by the lower ends of said depending beams, a fulcrum bar, means for mounting said fulcrum bar upon the bottom of the tractor at the rear of the supporting beam, a rocking arm mounted upon the fulcrum bar, a crank extending rearwardly from the rocking arm, and connections between the crank and said depending beams.

GEORGE ROACH. [L. S.]
DARRY WINN. [L. S.]